United States Patent
Helm

(10) Patent No.: US 10,773,645 B2
(45) Date of Patent: Sep. 15, 2020

(54) REMOTE MONITOR SYSTEM FOR A VEHICLE CARGO CARRIER

(71) Applicant: Toyota Motor Engineering & Manufacturing North America, Inc., Plano, TX (US)

(72) Inventor: Sean L. Helm, Saline, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/268,319

(22) Filed: Feb. 5, 2019

(65) Prior Publication Data

US 2020/0247317 A1  Aug. 6, 2020

(51) Int. Cl.
| | | |
|---|---|---|
| *B60Q 1/26* | (2006.01) | |
| *B60Q 9/00* | (2006.01) | |
| *G06F 9/451* | (2018.01) | |
| *B60R 1/00* | (2006.01) | |
| *B60Q 3/30* | (2017.01) | |

(52) U.S. Cl.
CPC ............. *B60Q 9/00* (2013.01); *B60Q 3/30* (2017.02); *B60R 1/00* (2013.01); *G06F 9/451* (2018.02)

(58) Field of Classification Search
USPC .......................................................... 340/438
See application file for complete search history.

(56) References Cited

U.S. PATENT DOCUMENTS

| | | | |
|---|---|---|---|
| 5,038,983 A | 8/1991 | Tomososki | |
| 5,667,116 A | 9/1997 | Reinhart et al. | |
| 6,234,371 B1 | 5/2001 | Sinn | |
| 7,055,896 B2 | 6/2006 | Ozkok et al. | |
| 7,144,070 B2 | 12/2006 | Wiebe et al. | |
| 7,699,372 B2 | 4/2010 | Adams et al. | |
| 7,877,209 B2 | 1/2011 | Harris et al. | |
| 9,030,321 B2 | 5/2015 | Breed | |
| 9,150,158 B2 | 10/2015 | Reiber | |
| 9,738,125 B1 | 8/2017 | Brickley et al. | |
| 9,854,885 B2 | 1/2018 | Espig | |
| 2005/0200482 A1* | 9/2005 | Kurple | B25H 3/02 340/545.7 |
| 2006/0202809 A1* | 9/2006 | Lane | G06Q 10/08 340/438 |
| 2008/0238643 A1* | 10/2008 | Malen | B60Q 9/00 340/438 |
| 2010/0320245 A1 | 12/2010 | Vilkomirski et al. | |
| 2012/0018474 A1 | 1/2012 | Lindberg et al. | |
| 2017/0334344 A1* | 11/2017 | Salter | G08B 5/36 |
| 2017/0372484 A1* | 12/2017 | Carlson | B60R 1/00 |
| 2018/0099712 A1* | 4/2018 | Bean | H04L 12/2803 |
| 2018/0257544 A1 | 9/2018 | Salter et al. | |

* cited by examiner

*Primary Examiner* — Brent Swarthout
(74) *Attorney, Agent, or Firm* — Snell & Wilmer LLP

(57) ABSTRACT

Methods, systems, and apparatuses for monitoring a cargo carrier attached to an exterior of a vehicle. The system includes one or more sensors configured to detect sensor data associated with the cargo carrier. The system also includes a processor communicatively coupled to the one or more sensors. The processor is configured to receive the sensor data from the one or more sensors. The processor is also configured to detect an adverse event based on the sensor data. The system also includes a display screen communicatively coupled to the processor and configured to display alert information when the adverse event is detected.

20 Claims, 7 Drawing Sheets

REMOTE MONITOR SYSTEM FOR A VEHICLE CARGO CARRIER

BACKGROUND

1. Field

The invention relates to a system and a method for monitoring a vehicle cargo carrier.

2. Description of the Related Art

Vehicles may store items in an interior area of the vehicle, such as a back seat or a trunk. However, there may only be limited area within the vehicle for cargo. In order to store more cargo, additional containers attached to an exterior of the vehicle may be used. For example, a cardboard box or a plastic container may be filled with cargo and elastic cables may be used to tie these containers to a roof rack of a vehicle. Pickup trucks may also store these containers in the truck bed of the pickup truck. In this way, the cargo carrying capacity of the vehicle is improved. However, the cargo carried in these containers are vulnerable to theft, as these containers are located exterior to the vehicle. Thus, there is a need for improved devices for storing cargo.

SUMMARY

What is described is a system for monitoring a cargo carrier attached to an exterior of a vehicle. The system includes one or more sensors configured to detect sensor data associated with the cargo carrier. The system also includes a processor communicatively coupled to the one or more sensors. The processor is configured to receive the sensor data from the one or more sensors. The processor is also configured to detect an adverse event based on the sensor data. The system also includes a display screen communicatively coupled to the processor and configured to display alert information when the adverse event is detected.

Also described is a vehicle being attached to a cargo carrier. The vehicle includes a transceiver configured to receive, from the cargo carrier, sensor data detected by one or more sensors of the cargo carrier. The vehicle also includes an electronic control unit (ECU) connected to the transceiver. The ECU is configured to detect an adverse event based on the sensor data. The ECU is also configured to render a graphical user interface including alert information based on the sensor data when the adverse event is detected. The vehicle also includes a display screen connected to the ECU and configured to display the alert information.

Also described is a method of monitoring a cargo carrier. The method includes detecting, by one or more sensors of the cargo carrier, sensor data associated with the cargo carrier. The method also includes detecting, by a processor, an adverse event based on the sensor data. The method also includes rendering, by the processor, a graphical user interface including alert information when the adverse event is detected. The method also includes displaying, by a display screen, the alert information.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for managing access to a vehicle cargo carrier. As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Conventional boxes or containers that are attached to a vehicle, either in a truck bed or strapped to a roof rack, are vulnerable to theft. These conventional boxes and containers are not located within the interior of the vehicle, and if an individual were to open the containers to rummage through the contents of the containers, there would be no alarm activated, whereas if the container was inside a locked vehicle, the individual would trigger an alarm while attempting to access the container. Further, if these conventional containers had a leak or were exposed to other undesirable conditions, the users of the containers may not be aware of these issues until the damage is done.

The systems and methods described herein monitor the cargo carrier attached to a vehicle and provide alerts when sensors of the cargo carrier detect an adverse event. In this way, the users of the cargo carrier are made promptly aware of issues to the cargo carrier and the items inside of the cargo carrier so that the issues may be addressed.

The cargo carriers described herein are special-purpose devices used to store items and be attached to a vehicle. The cargo carriers described herein have features to integrate the cargo carrier with the vehicle, making the cargo carrier a more specialized device as compared to a conventional box or other conventional storage device. The cargo carriers described herein include one or more connectors that allow the cargo carrier to be securely connected to an exterior of a vehicle, which may not be possible with a conventional box or other conventional storage devices.

Figure 1A:
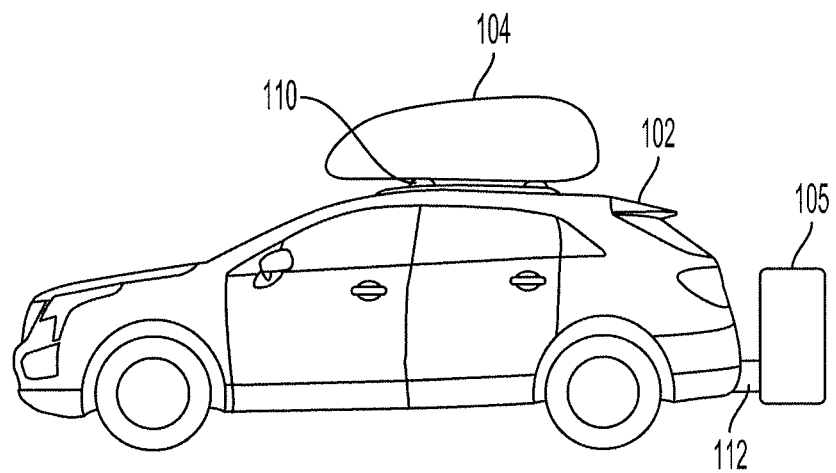
FIG. 1A illustrates a vehicle using a vehicle cargo carrier on top of the vehicle and attached to a trailer hitch of the vehicle, according to various embodiments of the invention.

FIG. 1A illustrates a first vehicle 102 that is a sport utility vehicle. The first vehicle 102 has a cargo carrier 104 attached to a roof rack 110 of the first vehicle 102. The first vehicle 102 also has a cargo carrier 105 attached to a trailer hitch 112. While the first vehicle 102 is shown as being a sport utility vehicle, the first vehicle 102 may be any vehicle capable of having a cargo carrier attached to the vehicle at an exterior location.

Figure 1B:
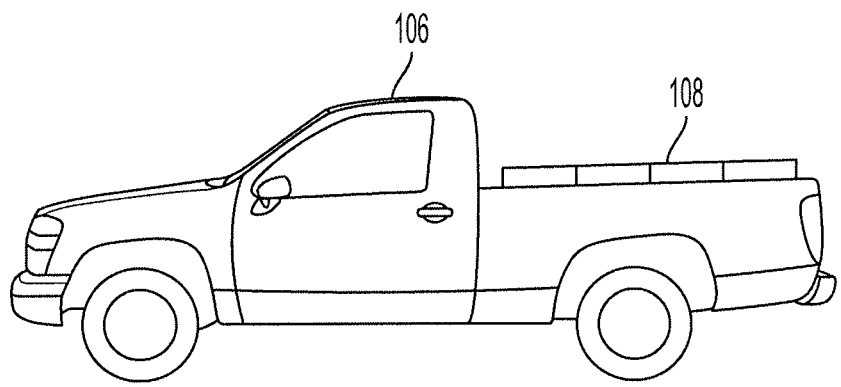
FIG. 1B illustrates a vehicle using a vehicle cargo carrier in the truck bed of the vehicle, according to various embodiments of the invention.

FIG. 1B illustrates a second vehicle 106 that is a pickup truck. The second vehicle 106 has a cargo carrier 108 that is attached to one or more truck bed connection points located within the truck bed. As illustrated by the first vehicle 102 and the second vehicle 106, the cargo carriers 104, 105, and 108 are attached to their respective vehicles on an exterior connection point. Unlike storage areas within the passenger cabin of the vehicle or the trunk of the vehicle that are located on the interior of the vehicle, the cargo carriers 104, 105, and 108 are capable of being accessed by an individual who does not need access to the interior of the vehicle. Thus, the items within the cargo carriers, or the cargo carriers themselves, are vulnerable to theft.

Conventional vehicles are not communicatively coupled to the cargo carriers, and if conventional cargo carriers were to be broken into or removed from conventional vehicles, the alarm of the conventional vehicle would not be activated. However, the cargo carriers described herein are communicatively coupled to their respective vehicles, and the vehicle may monitor the status of the cargo carrier, and take appropriate action, as described herein.

Figure 1C:
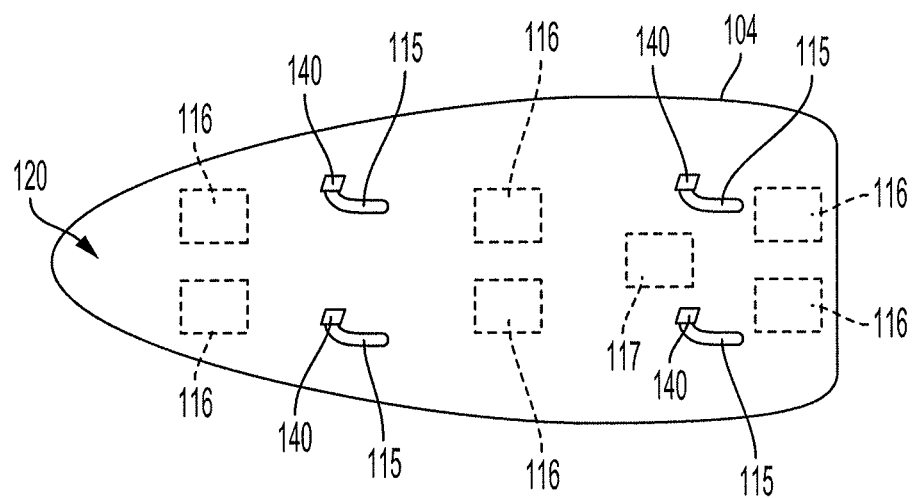
FIG. 1C illustrates a bottom side of the vehicle cargo carrier, according to various embodiments of the invention.

FIG. 1C illustrates a bottom side of the cargo carrier 104 of FIG. 1A. The cargo carrier 104 has a bottom side 120 that faces the vehicle 102. The cargo carrier 104 may have one or more connectors 115 for engaging a part of the vehicle 102. The connectors 115 may be brackets or arms configured to engage a roof rack 110 of the vehicle 102. The connectors 115 may be located on the bottom side 120 of the cargo carrier 104 and may protrude from the cargo carrier 104. The cargo carrier 104 may also have one or more locks 140 corresponding to each of the connectors 115. Each lock 140 may be configured to ensure that its respective connector 115 remains in a locked and engaged state until the lock 140 is unlocked. The lock 140 may be unlocked by a physical key or by an electronic signal that is an instruction to unlock the lock 140.

The cargo carrier 104 also includes one or more sensors 116. The one or more sensors 116 are configured to detect various types of data associated with the cargo carrier 104. The sensors 116 may include one or more weight sensors configured to detect weight data associated with the cargo carrier 104. The weight data may be analyzed to determine whether the contents of the cargo carrier 104 have shifted significantly. The sensors 116 may also include a temperature sensor configured to detect temperature data within the cargo carrier 104. The temperature data may be used to determine whether a temperature inside of the cargo carrier 104 has exceeded a threshold temperature. The sensors 116 may also include an image sensor configured to detect image data within the cargo carrier 104 and/or outside of the cargo carrier 104. The image data may be used to visually monitor the interior of the cargo carrier 104 and/or to visually monitor who has accessed the cargo carrier 104. The sensors 116 may also include a lock sensor configured to detect whether the cargo carrier 104 is in a locked or unlocked state. The sensors 116 may also include an opening sensor configured to detect whether the cargo carrier 104 is open or closed. The sensors 116 may also include a moisture sensor configured to detect moisture data within the cargo carrier 104. The moisture data may be used to determine whether any moisture is affecting the contents of the cargo carrier 104.

The cargo carrier 104 also includes a transceiver 117 configured to communicate and receive data with the vehicle 102. The cargo carrier 104 may communicate any of the sensor data described herein to the vehicle 102. The vehicle 102 may analyze the sensor data and determine one or more actions based on the sensor data. For example, when the sensor data indicates that the lock sensors detect unauthorized opening of the cargo carrier 104, the vehicle 102 may activate a vehicle alarm system and/or send a warning communication to a mobile device of the driver. In another example, when the moisture data indicates that there is moisture within the cargo carrier 104 exceeding a moisture threshold, the vehicle 102 may provide a moisture warning on a display screen within the vehicle 102 indicating that excess moisture has been detected. The vehicle 102 may also send a warning communication to the mobile device of the driver.

The sensors 116 may be integrated into the cargo carrier 104 or may be attached to a third-party cargo carrier 104. Similarly, the transceiver 117 may be integrated into the cargo carrier 104 or may be attached to a third-party cargo carrier 104.

The cargo carrier 104 may have an interior cavity for storing cargo. The cargo carrier 104 may also have a lock configured to secure access to the interior cavity of the cargo carrier 104. The lock may be locked and unlocked remotely using a keyfob or a mobile device. The keyfob may be a remote keyless entry keyfob associated with the vehicle 102.

If a sensor of the lock detects that the lock is being tampered with in an effort to open the cargo carrier 104 without providing access credentials, one or more alarms, including the theft alarm of the vehicle 102 may be activated.

Further still, locks 140 associated with the connectors 115 of the cargo carrier 104 may be locked and unlocked remotely using a keyfob or a mobile device. If a sensor of the locks 140 detects that the lock 140 is being tampered with in an effort to remove the cargo carrier 104 from the vehicle 102 without providing access credentials, one or more alarms, including the theft alarm of the vehicle 102, may be activated. The connectors 115 may be locked or unlocked with a mobile device or keyfob when the cargo carrier 104 is moved from one vehicle to another.

In some embodiments, a camera may be located within the interior cavity of the cargo carrier 104 and may be configured to detect image data within the interior cavity of the cargo carrier 104. The camera may be triggered to detect image data when any of the locks described herein are locked and/or unlocked or when any of the locks are tampered with.

Figure 1D:
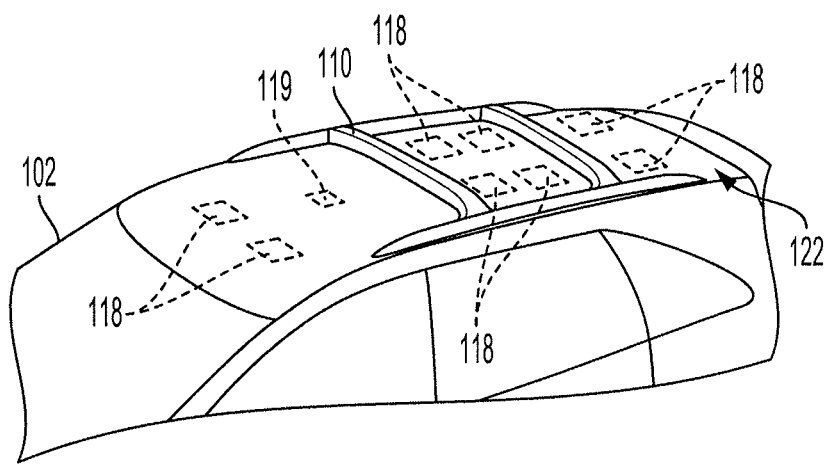
FIG. 1D illustrates a view of the roof of a vehicle, according to various embodiments of the invention.

FIG. 1D illustrates a view of the roof of a vehicle 102. The roof of the vehicle 102 may be a top surface 122 of the vehicle 102. There may be roof racks 110 located along the roof of the vehicle and configured to engage with or be engaged by one or more connectors (e.g., connectors 115) of the cargo carrier 104. The vehicle 102 may also include a transceiver 119 configured to transmit and receive data with the cargo carrier 104.

The vehicle 102 may include one or more sensors 118 that contact the cargo carrier 104 or are located within a sensing distance of the cargo carrier 104. The sensors 118 may be configured to detect cargo carrier data. The cargo carrier data may include any data associated with the cargo carrier 104 that is capable of being detected from outside of the cargo carrier 104. The sensors 118 may include one or more weight sensors configured to detect weight data associated with the cargo carrier 104. The weight data may be analyzed to determine whether the contents of the cargo carrier 104 have shifted significantly. The sensors 118 may also include a temperature sensor configured to detect temperature data of the cargo carrier 104. The temperature data may be used to determine whether a temperature inside of the cargo carrier 104 has exceeded a threshold temperature. The data capable of being detected by the sensors 118 may not be as robust as the data capable of being detected by the sensors 116 of the cargo carrier 104, but the sensors 118 may be able to provide insight on the status of the cargo carrier 104 when the cargo carrier 104 does not have any sensors 116. In some embodiments, the sensors 118 of the vehicle 102 complement the sensors 116 of the cargo carrier 104.

Figure 1E:
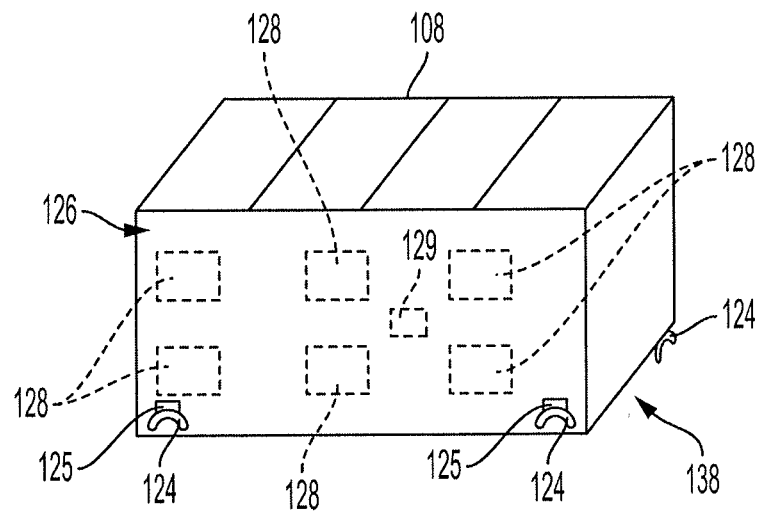
FIG. 1E illustrates a bottom side of the vehicle cargo carrier, according to various embodiments of the invention.

FIG. 1E illustrates a bottom side of the cargo carrier 108 of FIG. 1B. The cargo carrier 108 has a bottom side 126 that faces the vehicle 106. In particular, the bottom side 126 may face the truck bed of the vehicle 106. The cargo carrier 108 may have one or more connectors 124 for engaging a part of the vehicle 106. The connectors 124 may be brackets or arms configured to engage corresponding connection points of the vehicle 106. The connectors 124 may be located on the bottom side 126 of the cargo carrier 108 and/or a side 138 of the cargo carrier 108 and may protrude from the cargo carrier 108. The cargo carrier 108 may also have one or more locks 125 corresponding to each of the connectors 124. Each lock 125 may be configured to ensure that its respective connector 124 remains in a locked and engaged state until the lock 125 is unlocked. The lock 125 may be unlocked by a physical key or by an electronic signal that is an instruction to unlock the lock 125.

The cargo carrier 108 also includes one or more sensors 128. The one or more sensors 128 are configured to detect various types of data associated with the cargo carrier 108. The sensors 128 may include one or more weight sensors configured to detect weight data associated with the cargo carrier 108. The weight data may be analyzed to determine whether the contents of the cargo carrier 108 have shifted significantly. The sensors 128 may also include a temperature sensor configured to detect temperature data within the cargo carrier 108. The temperature data may be used to determine whether a temperature inside of the cargo carrier 108 has exceeded a threshold temperature. The sensors 128 may also include an image sensor configured to detect image data within the cargo carrier 108 and/or outside of the cargo carrier 108. The image data may be used to visually monitor the interior of the cargo carrier 108 and/or to visually monitor who has accessed the cargo carrier 108. The sensors 128 may also include a lock sensor configured to detect whether the cargo carrier 108 is in a locked or unlocked state. The sensors 128 may also include an opening sensor configured to detect whether the cargo carrier 108 is open or closed. The sensors 128 may also include a moisture sensor configured to detect moisture data within the cargo carrier 108. The moisture data may be used to determine whether any moisture is affecting the contents of the cargo carrier 108.

The cargo carrier 108 also includes a transceiver 129 configured to communicate and receive data with the vehicle 106. The cargo carrier 108 may communicate any of the sensor data described herein to the vehicle 106. The vehicle 106 may analyze the sensor data and determine one or more actions based on the sensor data, as described herein.

The sensors 128 may be integrated into the cargo carrier 108 or may be attached to a third-party cargo carrier 108. Similarly, the transceiver 129 may be integrated into the cargo carrier 108 or may be attached to a third-party cargo carrier 108.

The cargo carrier 108 may have an interior cavity for storing cargo. The cargo carrier 108 may also have a lock configured to secure access to the interior cavity of the cargo carrier 108. The lock may be locked and unlocked remotely using a keyfob or a mobile device. The keyfob may be a remote keyless entry keyfob associated with the vehicle 106.

If a sensor of the lock detects that the lock is being tampered with in an effort to open the cargo carrier 108 without providing access credentials, one or more alarms, including the theft alarm of the vehicle 106 may be activated.

Further still, locks 125 associated with the connectors 124 of the cargo carrier 108 may be locked and unlocked remotely using a keyfob or a mobile device. If a sensor of the locks 125 detects that the lock M is being tampered with in an effort to remove the cargo carrier 108 from the vehicle 106 without providing access credentials, one or more alarms, including the theft alarm of the vehicle 106, may be activated. The connectors 124 may be locked or unlocked with a mobile device or keyfob when the cargo carrier 108 is moved from one vehicle to another.

In some embodiments, a camera may be located within the interior cavity of the cargo carrier 108 and may be configured to detect image data within the interior cavity of the cargo carrier 108. The camera may be triggered to detect image data when any of the locks described herein are locked and/or unlocked or when any of the locks are tampered with.

Figure 1F:
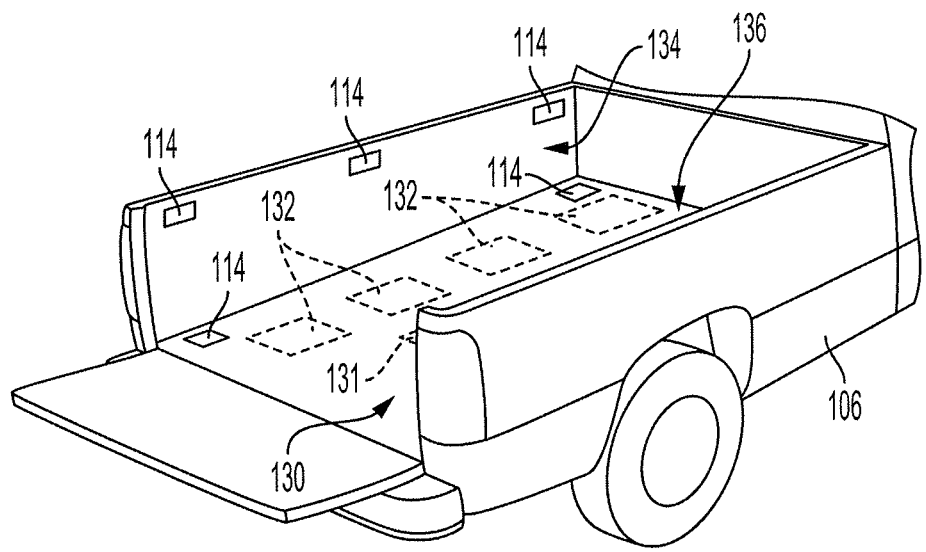
FIG. 1F illustrates a view of the truck bed of a vehicle, according to various embodiments of the invention.

FIG. 1F illustrates a view of the truck bed 136 of a vehicle 106. There may be connection points 114 located along a side 134 of the truck bed 136 of the vehicle or located along a bottom surface 130 of the truck bed 136. The connection points 114 are configured to engage with or be engaged by one or more connectors (e.g., connectors 124) of the cargo carrier 108. The vehicle 106 may also include a transceiver 119 configured to transmit and receive data with the cargo carrier 108.

The vehicle 106 may include one or more sensors 132 that contact the cargo carrier 108 or are located within a sensing distance of the cargo carrier 108. The sensors 132 may be configured to detect cargo carrier data. The cargo carrier data may include any data associated with the cargo carrier 108 that is capable of being detected from outside of the cargo carrier 108. The sensors 132 may include one or more weight sensors configured to detect weight data associated with the cargo carrier 108. The weight data may be analyzed to determine whether the contents of the cargo carrier 108 have shifted significantly. The sensors 132 may also include a temperature sensor configured to detect temperature data of the cargo carrier 108. The temperature data may be used to determine whether a temperature inside of the cargo carrier 108 has exceeded a threshold temperature. The data capable of being detected by the sensors 132 may not be as robust as the data capable of being detected by the sensors 128 of the cargo carrier 108, but the sensors 132 may be able to provide insight on the status of the cargo carrier 108 when the cargo carrier 108 does not have any sensors 128. In some embodiments, the sensors 132 of the vehicle 106 complement the sensors 128 of the cargo carrier 108.

Figure 2A:
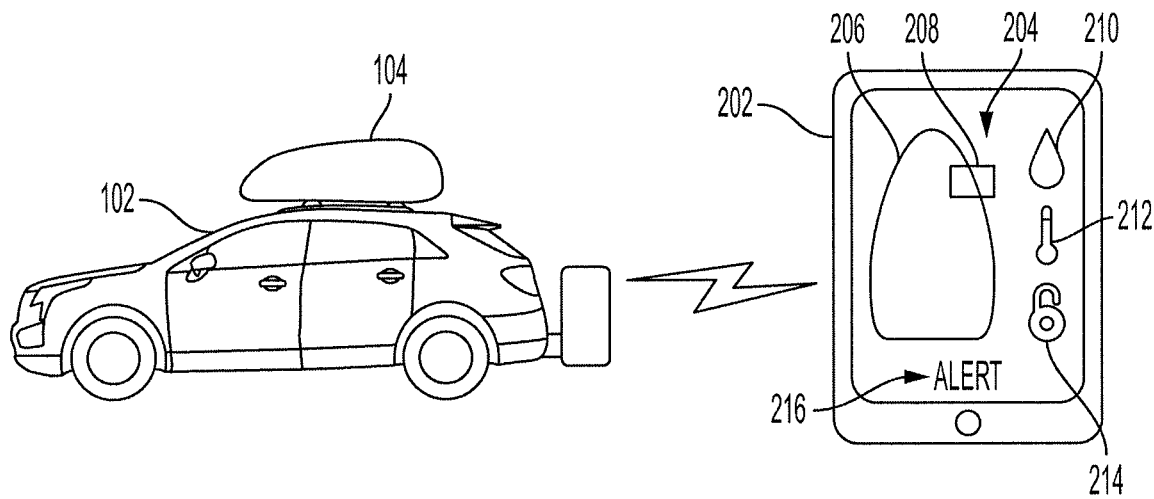
FIGS. 2A-2C illustrate communication and display of a warning alert, according to various embodiments of the invention.

FIG. 2A shows a vehicle 102 with a cargo carrier 104. The cargo carrier 104 may store one or more items (or cargo). The sensors (e.g., sensors 116) of the cargo carrier 104 detect sensor data. The sensor data may be provided to a processor of the cargo carrier 104 or an electronic control unit of the vehicle 102. The processor of the cargo carrier 104 or the electronic control unit of the vehicle 102 may determine that the cargo carrier 104 is encountering an adverse event based on the sensor data. An adverse event may be determined when the sensor data exceeds a threshold value. For example, when the sensor data includes moisture data and the moisture data indicates a moisture level inside of the cargo carrier 104 exceeds a moisture threshold, an adverse event may be determined. An adverse event may also be determined when the sensor data indicates an adverse state of the cargo carrier 104. For example, when the sensor data includes a lock sensor and the lock sensor indicates that the lock is in the unlocked state when the lock should be in the locked state, an adverse event may be determined.

In some embodiments, a baseline measurement is established by one or more sensors of the cargo carrier 104 prior to a trip (i.e., a continuous driving period of time or distance). The detected sensor data may be compared to the baseline measurement, and when the detected sensor data exceeds a threshold percentage increase or decrease may be determined. For example, a baseline moisture level of 30% humidity within the cargo carrier 104 may be detected prior to the trip. During the trip, when the detected moisture within the cargo carrier 104 exceeds a 200% increase in humidity (in this example, 60% humidity), an adverse event may be detected. In some embodiments, either a relative change in sensor data or a detection of sensor data above a threshold value may cause an adverse event to be detected by the processor of the cargo carrier 104 or an electronic control unit of the vehicle 102.

When the processor of the cargo carrier 104 or the electronic control unit of the vehicle 102 determines that the cargo carrier 104 is encountering an adverse event, a warning communication may be transmitted to the mobile device 202 of the driver or any individual associated with the cargo carrier 104 or the vehicle 102. In some embodiments, a transceiver of the cargo carrier 104 transmits the warning communication to the mobile device 202. In some embodiments, a transceiver of the vehicle 102 transmits the warning communication to the mobile device 202. In some embodiments, the warning communication is transmitted directly from device to device. In some embodiments, the warning communication is transmitted from one device to another via one or more other devices interconnected in a network (e.g., the Internet).

The warning communication may include an identification of one or more aspects of the cargo carrier 104 which the driver may wish to attend to. In some embodiments, a notification is generated by the mobile device 202 to alert the user of the mobile device to the potential issue with the cargo carrier 104. The mobile device 202 may include a processor configured to render a graphical user interface 204 that includes an alert identifying of the one or more aspects of the cargo carrier 104 which the driver may wish to attend to.

The graphical user interface 204 may include an outline 206 of the cargo carrier 104. The graphical user interface 204 may include a location marker 208 for a location on the cargo carrier 104 where an adverse event may be detected. The graphical user interface 204 may also include one or more icons 210, 212, 214 each associated with an aspect of the cargo carrier 104. A first icon 210 may be shown when the moisture data of a moisture sensor indicates that a moisture level of the cargo carrier 104 may be too high. A second icon 212 may be shown when the temperature data of a temperature sensor indicates that a temperature of the cargo carrier 104 may be too high. A third icon 214 may be shown when a lock sensor of the cargo carrier 104 detects that the lock is in an unlocked state when the lock is expected to be in a locked state. The graphical user interface 204 may also include text explaining various parts of the graphical user interface 204 or to bring attention to the graphical user interface. The icons 210, 212, 214 may be tapped, clicked, or otherwise engaged to prompt additional, more specific sensor data corresponding to the icon.

By providing the warning communication to the mobile device 202, the driver of the vehicle 102, even while away from the vehicle 102, may be made aware that there is an issue with the cargo carrier 104 that may require the driver to return to the vehicle 102. In this way, the driver may address the issue in an expedient manner to mitigate any damage done to the cargo of the cargo carrier 104.

In addition to transmitting the warning communication to the mobile device 202, the cargo carrier 104 may communicate the warning communication to the vehicle 102. The vehicle 102 may display, on a display screen of the vehicle 102, the identification of the one or more aspects of the cargo carrier 104 which the driver may wish to attend to. In some embodiments, an electronic control unit of the vehicle 102 renders a graphical user interface 204 that is similar to the graphical user interface 204 rendered by the processor of the mobile device 202.

Figure 2B:
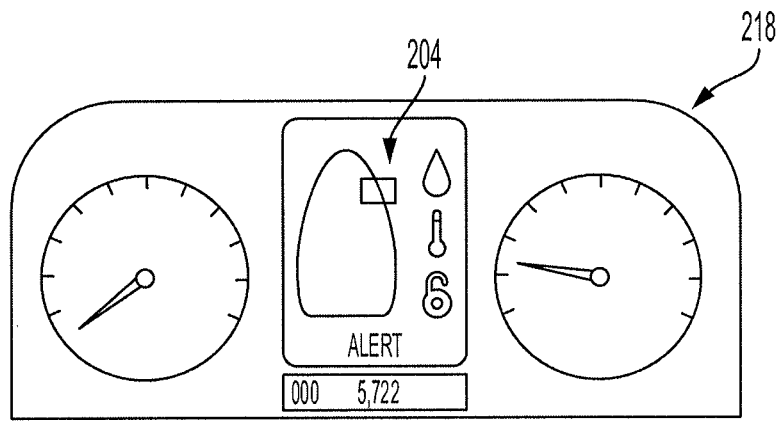

FIG. 2B illustrates an instrument panel 218 of the vehicle 102. The instrument panel 218 includes a display screen configured to display the graphical user interface 204. As described herein, the graphical user interface 204 may include an outline 206 of the cargo carrier 104, a location marker 208 for a location on the cargo carrier 104 where an adverse event may be detected, and one or more icons 210, 212, 214 each associated with an aspect of the cargo carrier 104. While FIG. 2B illustrates the graphical user interface 204 as being presented between two gauges of the instrument panel 218, in some embodiments, the graphical user interface 204 may also be presented as a head up display projected onto a clear surface in front of the driver, such as a window.

Figure 2C:
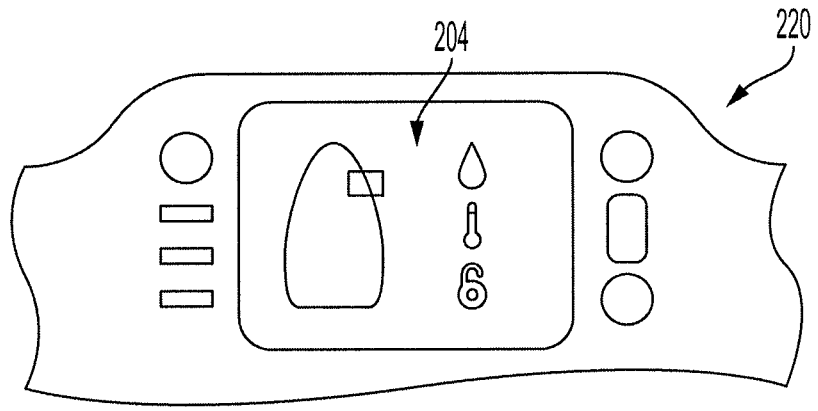

FIG. 2C illustrates an infotainment unit 220 of the vehicle 102. The infotainment unit 220 includes a display screen configured to display the graphical user interface 204. As described herein, the graphical user interface 204 may include an outline 206 of the cargo carrier 104, a location marker 208 for a location on the cargo carrier 104 where an adverse event may be detected, and one or more icons 210, 212, 214 each associated with an aspect of the cargo carrier 104.

By displaying the graphical user interface 204 within the passenger cabin of the vehicle 102, the occupants of the vehicle 102 may be aware of the status of the cargo carrier 104 as the vehicle 102 is being driven. By knowing the status of the cargo carrier 104 as the vehicle 102 is being driven steps to address any issues associated with the cargo carrier 104 may be taken. For example, the vehicle 102 may be driven in snowing conditions with clothes and other luggage in the cargo carrier 104, and the cargo carrier 104 may have a crack in the exterior shell, allowing snow and precipitation to enter the interior cavity of the cargo carrier 104. Using the systems and methods described herein, one or more sensors of the cargo carrier 104 may detect either the crack or the increased moisture conditions within the interior cavity of the cargo carrier 104, and the graphical user interface 204 may show a first icon 210 associated with moisture in the cargo carrier 104. In this way, the occupants may stop the vehicle 102 to repair the cargo carrier 104 or to take any other remedial steps, such as purchasing replacement clothes or finding a place to dry the wet clothes.

In addition to being alerted to any detected issues with the cargo carrier 104, the systems and methods described herein may provide visual feedback to the driver of the vehicle regarding the status of the interior of the cargo carrier 104.

Figure 3A:
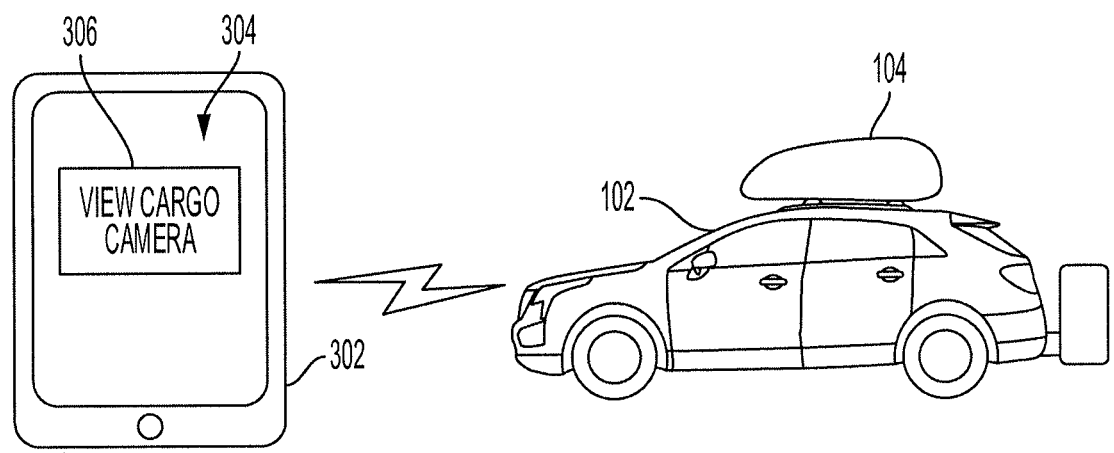
FIGS. 3A-3B illustrate display of a view of the cargo carrier, according to various embodiments of the invention.

FIG. 3A illustrates a mobile device 302 (e.g., mobile device 202) presenting a graphical user interface 304. One or more processors of the mobile device 302 may render the graphical user interface 304 that is displayed on a display screen of the mobile device 302. The graphical user interface 304 includes an icon 306 that, when engaged, provides a view of the interior cavity of the cargo carrier 104.

When the icon 306 is engaged or pressed, the mobile device 302 transmits a request to the vehicle 102 and/or the cargo carrier 104 for image data associated with the interior cavity of the cargo carrier 104. When the vehicle 102 received the request, the vehicle 102 transmits the request to the cargo carrier 104.

Figure 3B:
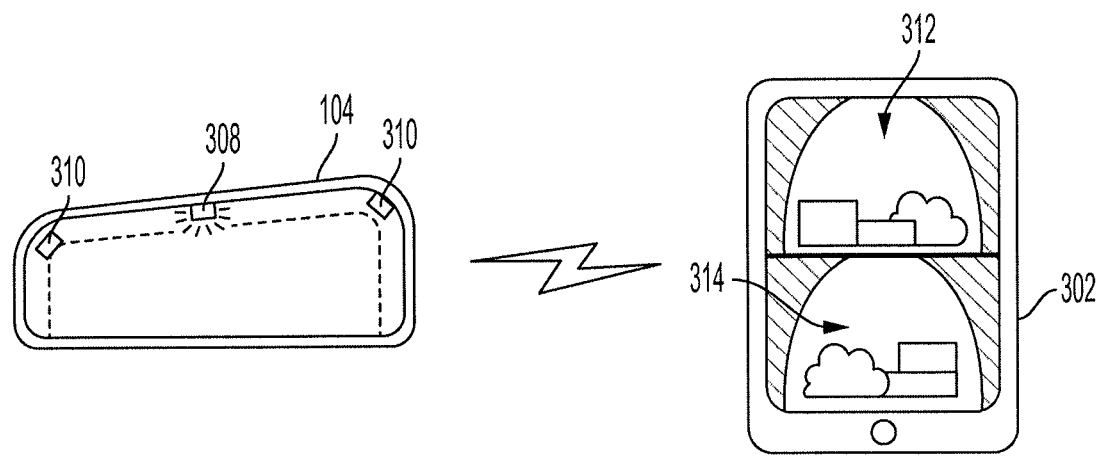

As illustrated in FIG. 3B, one or more image sensors 310 detect image data associated with the interior cavity of the cargo carrier 104. The image sensors 310 may be located in any orientation within the cargo carrier 104. Within the cargo carrier 104 may also be a light 308 configured to provide light. In some embodiments, the image sensor 310 is capable of night vision. In some embodiments, the image sensor 310 uses the light 308 to detect image data.

The detected image data from the image sensors 310 is transmitted to the mobile device 302. The detected image data may be transmitted using a transceiver of the cargo carrier 104 or a transceiver of the vehicle 102. The mobile device 302 may display a first view 312 of the interior cavity of the cargo carrier 104 based on a first image sensor and a second view 314 of the interior cavity of the cargo carrier 104 based on a second image sensor. Various images may be stitched together to provide a continuous image, or multiple discrete images may be provided from each of the image sensors.

The image data may also be displayed in an instrument panel (e.g., instrument panel 218) or an infotainment unit (e.g., infotainment unit 220) of the vehicle 102, in a similar manner as described herein with respect to FIGS. 2B and 2C.

By being able to view the image data detected by image sensors 310 within the cargo carrier 102, the driver or occupant of the vehicle 102 is able to visually confirm warning communications received from the cargo carrier 104. The driver or occupant may also be able to view the conditions within the cargo carrier 104 at any moment. The image data may be saved to a memory (local to the cargo carrier 104 and/or a remote memory) for later viewing. The saved image data may be used in an event where the cargo carrier 104 is broken into. In some embodiments, the image sensors 310 and/or the light 308 may automatically activate when the cargo carrier 104 is open or one or more sensors detect an adverse event.

While FIGS. 2A-2C and FIGS. 3A-3B illustrate a rooftop cargo carrier, the systems and methods described with respect to FIGS. 2A-2C and FIGS. 3A-3B may be used in a cargo carrier located on a truck bed (e.g., cargo carrier 108), a cargo carrier attached to a trailer hitch (e.g., cargo carrier 105) or any cargo carrier attached to any external location of the vehicle 102. In some embodiments, in addition to the image sensors inside of the cargo carrier, the cargo carrier includes image sensors configured to detect image data outside of the cargo carrier.

Figure 4:
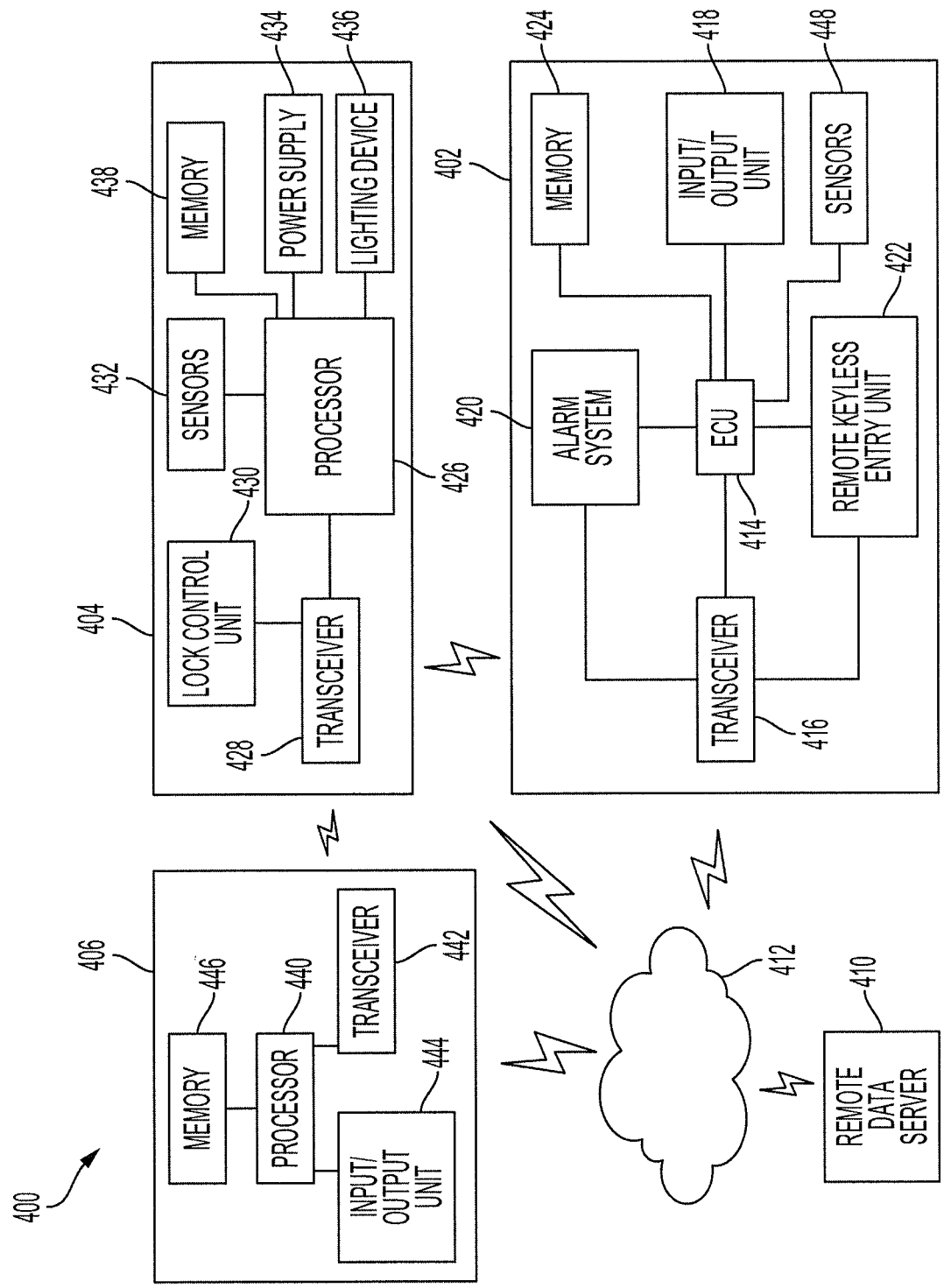
FIG. 4 illustrates the components of the system, according to various embodiments of the invention.

FIG. 4 illustrates a block diagram of the system 400. The system 400 includes a vehicle 402 (e.g., vehicle 102, 106), a cargo carrier 404 (e.g., cargo carrier 104, 105, 108), a remote data server 410, and a mobile device 406 (e.g., mobile device 202, 302).

The cargo carrier 404 may include a processor 426, a transceiver 428, a lock control unit 430, one or more sensors 432, a power supply 434, a lighting device 436, and a memory 438. In some embodiments, the components of the cargo carrier 404 are connected to each other using a communications bus.

The processor 426 (and any processors described herein) may be one or more computer processors configured to execute instructions stored on a non-transitory memory. The memory 438 may be a non-transitory memory configured to store data associated with the cargo carrier, such as sensor data. The memory 438 may also store sensor thresholds (e.g., moisture threshold, temperature threshold). As described herein, the sensor thresholds may be an absolute threshold (e.g., 70% humidity) or may be a relative threshold (e.g., 200% of the baseline sensor measurement).

The transceiver 428 (e.g., transceiver 117) may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 428 may transmit data to and receive data from devices and systems not physically connected to the vehicle. For example, the processor 426 may communicate with the remote data server 410, the vehicle 402, and/or the mobile device 406. Furthermore, the transceiver 428 may access the network 412, to which the remote data server 410, the vehicle 402, and/or the mobile device 406 are also connected.

The one or more sensors 432 (e.g., sensors 116) are configured to detect sensor data associated with the cargo carrier 404. The one or more sensors 432 may include one or more weight sensors configured to detect weight data associated with the cargo carrier 404. The weight data may be analyzed to determine whether the contents of the cargo carrier 104 have shifted significantly. The sensors 432 may also include a temperature sensor configured to detect temperature data within the cargo carrier 404. The temperature data may be used to determine whether a temperature inside of the cargo carrier 404 has exceeded a threshold temperature. The sensors 432 may also include an image sensor configured to detect image data within the cargo carrier 404. The image data may be used to visually monitor the interior of the cargo carrier 404 and/or to visually monitor who has accessed the cargo carrier 404. The sensors 432 may also include a lock sensor configured to detect whether the cargo carrier 404 is in a locked or unlocked state. The lock sensor may also be configured to detect tampering with any of the locks in an effort to open the cargo carrier 404 or any compartments of the cargo carrier 404. The sensors 432 may also include an opening sensor configured to detect whether the cargo carrier 404 is open or closed. The sensors 432 may also include a moisture sensor configured to detect moisture data within the cargo carrier 404. The moisture data may be used to determine whether any moisture is affecting the contents of the cargo carrier 404.

The lock control unit 430 is configured to lock and unlock the various locks (e.g., lock 140, 125) of the cargo carrier 404. In some embodiments, the lock control unit 430 is configured to change a state of each lock of the cargo carrier 404 between a locked state and an unlocked state. The lock control unit 430 may receive an instruction from the processor 426 to lock or unlock any of the locks, and the lock control unit 430 may also provide lock status data to the processor 426 for any of the locks. The lock control unit 430 may also be configured to detect attempted or actual unauthorized entry into the cargo carrier 404 or any compartment thereof. The lock control unit 430 may use one or more lock sensors as described herein.

The power supply 434 may be configured to power the components of the cargo carrier 404. The power supply 434 may include a battery and a power receiving device. The power receiving device may be a plug for receiving electricity from a power source, such as a power outlet. The power receiving device may be a solar panel array for converting light energy into electrical energy. The power receiving device may be an induction device for receiving electricity from a corresponding inductive power device of the vehicle 402.

The lighting device 436 may be a light configured to provide illumination. The lighting device 436 may be located on an interior cavity of the cargo carrier 404 or may be located within a compartment of the cargo carrier 404. The processor 426 may instruct the lighting device 436 to activate in various conditions. For example, the processor 426 may instruct the lighting device 436 to activate when the image sensor (e.g., a camera or video camera) is detecting image data. In another example, the processor 426 may instruct the lighting device 436 to activate when the cargo carrier 404 is open. The lighting device 436 may activate when the processor 426 determines that a theft may be occurring based on sensor data. The sensor data may indicate a reduction of weight of the contents of the cargo carrier 404 while the lock of the cargo 404 is in the locked state. The sensor data may one or more locks is damaged. The lighting device 436 may be used in low-light conditions (e.g., in a dark garage or at night) and may be activated when an indication from the vehicle 402 is received to activate the lighting device 436. For example, an indication to turn on the cargo carrier light may be received by the input/output unit 418, the indication may be communicated from the vehicle 402 (via transceiver 416) to the cargo carrier 404 (via transceiver 428) and the processor 426 may instruct the lighting device 436 to be activated.

The vehicle 402 is a conveyance capable of transporting a person, an object, or a permanently or temporarily affixed apparatus. The vehicle 402 may have an automatic or manual transmission. The vehicle 402 may be a self-propelled wheeled conveyance, such as a car, a sports utility vehicle, a truck, a bus, a van or other motor or battery driven vehicle. For example, the vehicle 402 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 402 may be semi-autonomous vehicle or an autonomous vehicle. That is, the vehicle 402 may be self-maneuvering and navigate without human input. An autonomous vehicle may use one or more sensors and/or a navigation unit to drive autonomously.

The vehicle 402 includes an ECU 414 connected to a transceiver 416, sensors 448, a memory 424, an alarm system 420, a remote keyless entry unit 422, and an input/output unit 418. In some embodiments, each of the elements of the vehicle 402 are connected via a communications bus.

The ECU 414 may be one or more ECUs, appropriately programmed, to control one or more operations of the vehicle. The one or more ECUs 414 may be implemented as a single ECU or in multiple ECUs. The ECU 414 may be electrically coupled to some or all of the components of the vehicle. In some embodiments, the ECU 414 is a central ECU configured to control one or more operations of the entire vehicle. In some embodiments, the ECU 414 is multiple ECUs located within the vehicle and each configured to control one or more local operations of the vehicle. In some embodiments, the ECU 414 is one or more computer processors or controllers configured to execute instructions stored in a non-transitory memory 424.

The sensors 448 may include one or more image sensors configured to detect image data of the environment around the vehicle 402. The image data may be used to determine individuals who accessed the cargo carrier 404. The image sensor may be a camera or video camera.

The sensors 448 may also include a location sensor configured to detect location data associated with the vehicle 402. The ECU 414 may use the location data along with map data stored in memory 424 to determine a location of the vehicle. In some embodiments, the location sensor has access to the map data and may determine the location of the vehicle and provide the location of the vehicle to the ECU 414. The location sensor may be a GPS unit or any other global location detection device. The location data may be used to track the location of the vehicle 402 and the cargo carrier 404.

The vehicle 402 may be coupled to a network 412. The network, such as a local area network (LAN), a wide area network (WAN), a cellular network, a digital short-range communication (DSRC), LORA (Long Range), the Internet, or any other type of interconnectivity or combinations thereof, connects the vehicle 402 to other devices, such as a remote data server 410, the cargo carrier 404, and/or the mobile device 406.

The transceiver 416 may be configured to transmit and receive data, similar to the transceiver 428. The transceiver 416 may receive various communications from the mobile device 406 (e.g., assignment communications, unlocking communications, locking communications, access communications) and the transceiver 416 may relay the received communications from the mobile device 406 to the cargo carrier 404.

The memory 424 is connected to the ECU 414 and may be connected to any other component of the vehicle. The memory 424 is configured to store any data described herein, such as any sensor thresholds (e.g., moisture threshold, temperature threshold) and any data received from the remote data server 410 via the transceiver 416. As described herein, the sensor thresholds may be an absolute threshold (e.g., 70% humidity) or may be a relative threshold (e.g., 200% of the baseline sensor measurement).

The alarm system (or alarm unit) 420 is configured to create an audible and/or visual alert to attract attention to the vehicle 402. The alarm system 420 may be activated by the ECU 414 when the ECU determines that one or more locks of the cargo carrier 404 are being tampered with. The lock control unit 430 of the cargo carrier 404 may communicate an indication to the processor 426 of the cargo carrier 404 that one or more locks of the cargo carrier 404 are being tampered with. The processor 426 of the cargo carrier 404 may communicate an indication to the ECU 414 (via the transceiver 428 of the cargo carrier 404 and the transceiver 416 of the vehicle 402) that the one or more locks of the cargo carrier 404 are being tampered with. The ECU 414 may communicate a signal to the alarm system 420 to cause the alarm system 420 to generate an audible and/or visual alert.

The remote keyless entry unit 422 is configured to receive a signal from a keyfob or the mobile device 406 to lock or unlock any of the locks described herein, including locks of the vehicle 402 and locks of the cargo carrier 404. The remote keyless entry unit 422 may receive a signal from a keyfob or the mobile device 406 and communicate a signal to the cargo carrier 404 (via the transceiver 416 of the vehicle 402 and the transceiver 428 of the cargo carrier 404) to lock or unlock a particular lock of the cargo carrier 404. The lock control unit 430 may receive the signal and lock or unlock the identified lock of the cargo carrier 404.

The input/output unit 418 may be a touchscreen display or a display screen and an input device, such as a keyboard, microphone, or buttons. The input/output unit 418 may be a touchscreen of an infotainment unit of the vehicle 402, a heads-up display, or a combination of a display screen of the infotainment unit and one or more buttons or knobs used to interact with the infotainment unit. The ECU 414 may be configured to render a graphical user interface to facilitate displaying of cargo carrier information, such as a lock status of the cargo carrier 404 or any information based on the sensor data described herein. The graphical user interface may also facilitate locking and unlocking of locks of the cargo carrier 404.

The remote data server 410 may store threshold data and/or historical sensor data for each of the sensors 432. The historical sensor data may be used in lieu of the baseline sensor measurement described herein. The mobile device 406 may use the remote data server 410 to facilitate communication with the cargo carrier 404. The mobile device 406 may also use the remote data server 410 to facilitate communication with the vehicle 402. Similarly, the vehicle 402 may use the remote data server 410 to facilitate communication with the cargo carrier 404. The remote data server 410 may also receive and store any sensor data detected by the sensors of the cargo carrier. The remote data server 410 may automatically analyze the sensor data and provide analysis to the vehicle and/or the cargo carrier. For example, the remote data server 410 may automatically analyze image data detected when the cargo carrier is opened, and may determine a user identity based on facial recognition technology, and the determined user identity may be communicated to the vehicle and/or cargo carrier.

The mobile device 406 (e.g., mobile device 202, 302) includes a processor 440, a memory 446, a transceiver 442, and an input/output unit 444, which may all be connected to each other via a communications bus. The processor 440 may be one or more computer processors configured to execute instructions stored on the non-transitory memory 446. The memory 446 may be a non-transitory memory configured to store data. The transceiver 442 may be configured to transmit and receive data, similar to transceivers 416 and 428. The input/output unit 444 may include a touchscreen display or a display screen and an input device, such as a keyboard, microphone, or buttons.

The processor of the mobile device 406 may be configured to render a graphical user interface (e.g., graphical user interface 204, 304) to facilitate displaying of cargo carrier information, as described herein. The graphical user interface may also facilitate pairing of the mobile device 406 with the vehicle 402 and/or the cargo carrier 404. The graphical user interface may also facilitate locking and unlocking of compartments in the cargo carrier 404, locking and unlocking of the cargo carrier 404 itself, and/or locking and unlocking of the locks for securing the cargo carrier 404 to the vehicle 402. In some embodiments, a keyfob of the vehicle 402 may be programmed to perform the unlocking and locking functions of the mobile device 406 described herein.

While only one remote data server 410 is shown, any number of remote data servers in communication with each other may be used. Multiple remote data servers may be used to increase the memory capacity of the data being stored across the remote data servers, or to increase the computing efficiency of the remote data servers by distributing the computing load across the multiple remote data servers. Multiple remote data servers may be interconnected using any type of network, or the Internet.

As used herein, a "unit" may refer to hardware components, such as one or more computer processors, controllers, or computing devices configured to execute instructions stored in a non-transitory memory.

In some embodiments, the transceivers (e.g., transceivers 416, 428, 444) communicate with each other wirelessly. In some embodiments, the transceivers communicate with each other via a wired connection.

Figure 5:
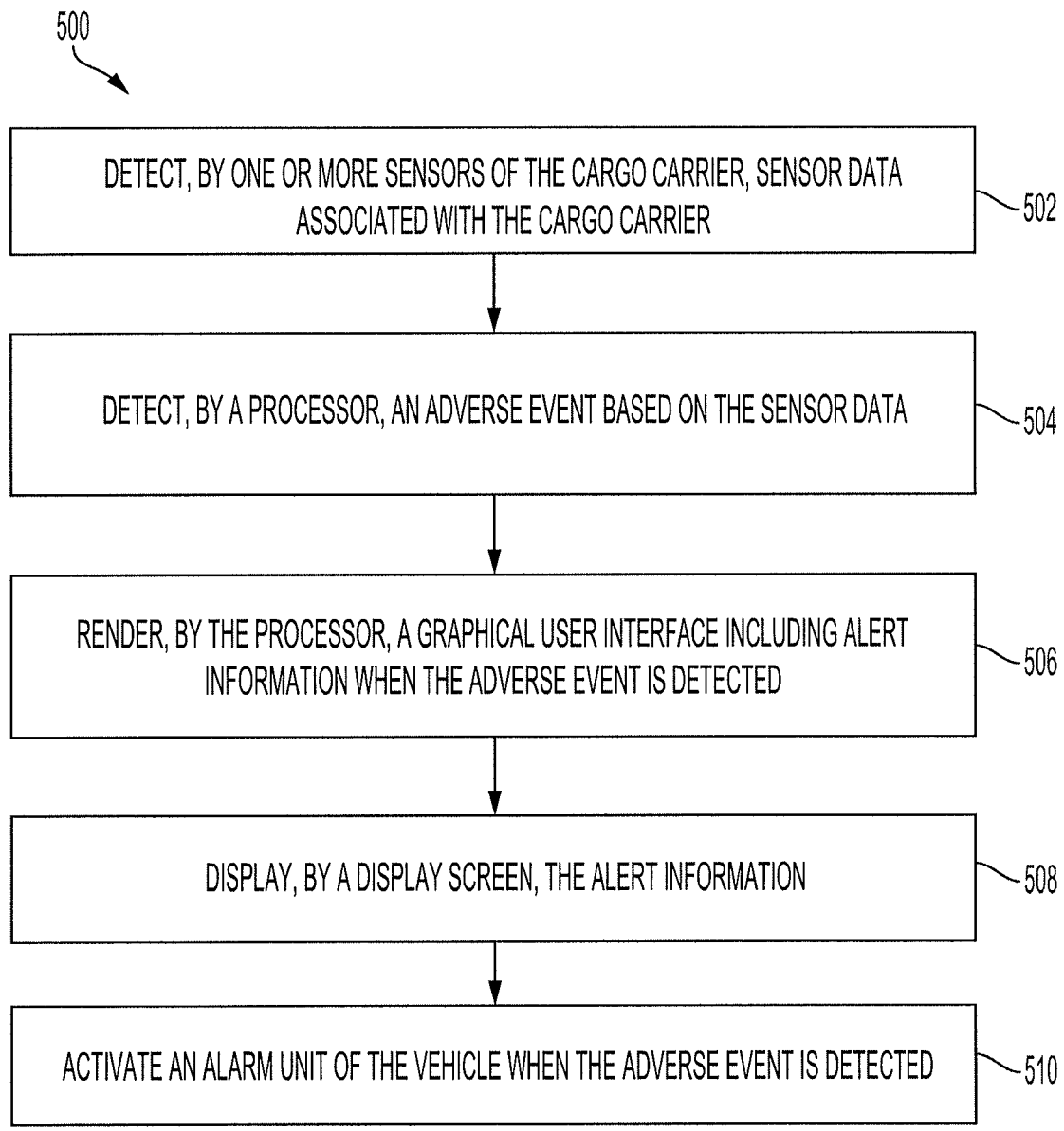
FIG. 5 illustrates a flow diagram of a process for monitoring a vehicle cargo carrier, according to various embodiments of the invention.

FIG. 5 is a flow diagram of a process 700 for monitoring a cargo carrier (e.g., cargo carrier 104, 105, 108, 404) attached to an exterior of a vehicle (e.g., vehicle 102, 106, 402).

One or more sensors (e.g., sensors 432) of a cargo carrier detect sensor data associated with the cargo carrier (step 502). As disclosed herein, the sensors may include a weight sensor configured to detect weight data of cargo stored inside the cargo carrier, a temperature sensor configured to detect temperature data associated with an interior cavity of the cargo carrier, an image sensor configured to detect image data of the interior cavity of the cargo carrier, a lock sensor configured to detect a state of each lock of the cargo carrier, an opening sensor configured to detect whether the cargo carrier is open or closed, or a moisture configured to detect moisture data associated with the interior cavity of the cargo carrier.

A processor detects an adverse event based on the sensor data (step 504). In some embodiments, the processor is a processor of the cargo carrier (e.g., processor 426). In some embodiments, the processor is an electronic control unit of the vehicle (e.g., ECU 414). In these embodiments, a transceiver of the cargo carrier (e.g., transceiver 428) communicates the sensor data to a transceiver of the vehicle (e.g., transceiver 416).

The detection of the adverse event may be based on various criteria and based on a type of sensor data. When the sensor data is a state of the cargo carrier, the adverse event detection may be made based on an expected state and an actual state. For example, when the sensor data is whether the cargo carrier is open or closed, the actual state of the cargo carrier is compared to the expected state, and when there is a mismatch, the adverse event is detected. In another example, when the sensor data is whether the cargo carrier is locked or unlocked, the actual state of the cargo carrier is compared to the expected state, and when there is a mismatch, the adverse event is detected.

When the sensor data is a sensor value, the adverse event detection may be made based on a comparison of detected sensor data and a threshold value. The threshold value may be an absolute value (e.g., above 110 degrees Fahrenheit, below 10 degrees Fahrenheit, above 75% humidity, below 10% humidity) or may be a relative value compared to a baseline value (e.g., above 150% of the baseline value, below 50% of the baseline value). The baseline value may be detected based on time (e.g., when the trip is started) or may be detected based on location (e.g., at a home location or a work location).

The processor renders a graphical user interface (e.g., graphical user interface 204) (step 506). The graphical user interface includes alert information when the adverse event is detected. The alert information may cause an individual (e.g., driver or occupant of the vehicle) to attend to the detected adverse event.

A display screen displays the alert information (step 508). The display screen may be that of a mobile device (e.g., mobile device 202) or that of the vehicle inside the passenger cabin (e.g., instrument panel 218, infotainment unit 220). In some embodiments, the display screen is also configured to display a view of the interior of the cargo carrier, as detected by one or more image sensors of the cargo carrier.

An alarm unit (e.g., alarm system 420) of the vehicle may be activated when the adverse event is detected (step 510). The alarm unit may be activated to call attention to the vehicle and the cargo carrier. In many embodiments, the alarm unit may only be activated when the vehicle is parked and/or turned off.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for monitoring a cargo carrier attached to an exterior of a vehicle, the system comprising:
   one or more connectors of the cargo carrier configured to engage a roof rack of the vehicle;
   a plurality of locks including one or more connector locks and one or more storage compartment locks;
   one or more sensors configured to detect sensor data associated with the cargo carrier, the one or more sensors including at least one of a lock sensor configured to detect a state of each lock of the plurality of locks or an opening sensor configured to detect whether the cargo carrier is open or closed;
   a processor communicatively coupled to the one or more sensors and configured to:
      receive the sensor data from the one or more sensors,
      detect an adverse event based on the sensor data, and
      instruct an image sensor to detect image data in response to the adverse event being detected; and
   a display screen communicatively coupled to the processor and configured to display alert information when the adverse event is detected.

2. The system of claim 1, wherein the processor is a processor of the cargo carrier and is further configured to render a graphical user interface including the alert information, the display screen further configured to display the graphical user interface.

3. The system of claim 1, wherein the processor is an electronic control unit (ECU) of the vehicle and is further configured to render a graphical user interface including the alert information, the display screen further configured to display the graphical user interface.

4. The system of claim 1, wherein the display screen is a display screen of a mobile device associated with a driver or user or occupant of the vehicle.

5. The system of claim 1, wherein the display screen is a display screen of an infotainment unit of the vehicle.

6. The system of claim 1, wherein the display screen is a display screen of an instrument panel or heads up display of the vehicle.

7. The system of claim 1, wherein the one or more sensors further include at least one of a weight sensor configured to detect weight data of cargo stored inside the cargo carrier, a temperature sensor configured to detect temperature data associated with an interior cavity of the cargo carrier, or a moisture sensor configured to detect moisture data associated with the interior cavity of the cargo carrier.

8. The system of claim 1, wherein the image sensor is located in an interior cavity of the cargo carrier and configured to detect image data of the interior cavity of the cargo carrier, and
   wherein the display screen is further configured to display a view of the interior cavity of the cargo carrier based on the image data.

9. The system of claim 8, further comprising a lighting device configured to provide illumination, the lighting device being activated when the image sensor detects image data and/or when the processor detects an adverse event based on the sensor data.

10. A vehicle being attached to a cargo carrier, the vehicle comprising:
    a roof rack configured to be engaged by one or more connectors having corresponding connector locks of the cargo carrier;
    a transceiver configured to receive, from the cargo carrier, sensor data detected by one or more sensors of the cargo carrier, the sensor data including a state of each lock of a plurality of locks of the cargo carrier or whether the cargo carrier is open or closed, the plurality of locks including one or more connector locks and one or more storage compartment locks;
    an electronic control unit (ECU) connected to the transceiver and configured to:
       detect an adverse event based on the sensor data,
       render a graphical user interface including alert information based on the sensor data when the adverse event is detected, and
       instruct an image sensor to detect image data in response to the adverse event being detected; and
    a display screen connected to the ECU and configured to display the alert information.

11. The vehicle of claim 10, wherein the transceiver is further configured to transmit a warning communication to a mobile device associated with a driver or user or occupant of the vehicle when the adverse event is detected.

12. The vehicle of claim 10, wherein the display screen is a display screen of an infotainment unit.

13. The vehicle of claim 10, wherein the display screen is a display screen of an instrument panel or heads up display.

14. The vehicle of claim 10, wherein the sensor data further includes at least one of weight data of cargo stored inside the cargo carrier, temperature data associated with an interior cavity of the cargo carrier, or moisture data associated with the interior cavity of the cargo carrier.

15. The vehicle of claim 10, further comprising an alarm unit connected to the ECU and configured to be activated to call attention to the cargo carrier when the adverse event is detected.

16. The vehicle of claim 10, wherein the image data is of an interior cavity of the cargo carrier, and wherein the display screen is further configured to display a view of the interior cavity of the cargo carrier based on the image data.

17. A method of monitoring a cargo carrier having one or more connectors with corresponding connector locks, configured to engage a roof rack or a vehicle, the method comprising:

detecting, by one or more sensors of the cargo carrier, sensor data associated with the cargo carrier, the sensor data including a state of each lock of a plurality of locks of the cargo carrier or whether the cargo carrier is open or closed, the plurality of locks including one or more connector locks and one or more storage compartment locks;

detecting, by a processor, an adverse event based on the sensor data;

rendering, by the processor, a graphical user interface including alert information when the adverse event is detected;

detecting, by an image sensor, image data in response to the adverse event being detected; and displaying, by a display screen, the alert information.

18. The method of claim 17, wherein the processor detects the adverse event by determining whether the sensor data exceeds a threshold value.

19. The method of claim 17, wherein the sensor data further includes at least one of weight data of cargo stored inside the cargo carrier, temperature data associated with an interior cavity of the cargo carrier, or moisture data associated with the interior cavity of the cargo carrier.

20. The method of claim 17, further comprising activating an alarm unit of the vehicle when the adverse event is detected.

* * * * *